US011182460B2

(12) United States Patent
Huang et al.

(10) Patent No.: US 11,182,460 B2
(45) Date of Patent: Nov. 23, 2021

(54) LOST DETECTION FOR PAIRED MOBILE DEVICES

(71) Applicant: INTERNATIONAL BUSINESS MACHINES CORPORATION, Armonk, NY (US)

(72) Inventors: Gui Song Huang, Wuxi (CN); Hong Gang Liu, Shanghai (CN); Wen Dong Wang, Shanghai (CN); Xi Ling Cai, Shanghai (CN); Li Zhen Zhou, Shanghai (CN); Ting Li, Shanghai (CN); Cui Su, Wuhan (CN); Jing Wen Zhou, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 507 days.

(21) Appl. No.: 16/162,492

(22) Filed: Oct. 17, 2018

(65) Prior Publication Data
US 2020/0125703 A1 Apr. 23, 2020

(51) Int. Cl.
G06F 21/31 (2013.01)
G08B 21/24 (2006.01)
H04W 4/02 (2018.01)
H04W 4/80 (2018.01)

(52) U.S. Cl.
CPC .......... G06F 21/316 (2013.01); G08B 21/24 (2013.01); H04W 4/027 (2013.01); H04W 4/80 (2018.02)

(58) Field of Classification Search
CPC ....... G06F 21/316; G06F 21/88; G08B 21/24; G08B 29/186; G08B 13/1436; H04W 4/027; H04W 4/80
See application file for complete search history.

(56) References Cited

U.S. PATENT DOCUMENTS

| 9,244,888 | B2 | 1/2016 | Brush et al. |
| 9,536,072 | B2 | 1/2017 | Guedalia et al. |
| 2015/0254962 | A1 | 9/2015 | Lee et al. |
| 2020/0112856 | A1* | 4/2020 | Asher .................. G06N 3/0481 |

FOREIGN PATENT DOCUMENTS

CN 105741462 A 7/2016

OTHER PUBLICATIONS

Mell, et al., "The NIST Definition of Cloud Computing", Recommendations of the National Institute of Standards and Technology, Special Publication 800-145, Sep. 2011, 7 pages.

(Continued)

Primary Examiner — Eugene Yun
(74) Attorney, Agent, or Firm — Teddi E. Maranzano

(57) ABSTRACT

A computer implemented method, computer system and computer program product are provided for lost detection for paired mobile devices. According to the method, a processor receives behavior data of paired mobile devices from one or more sensors of the paired mobile devices, wherein the behavior data comprising one or more parameters that reflect current status of the paired mobile devices. And the processor compares the received behavior data with human behavior data model. And, in response to the received behavior data being not matched with the human behavior data model, the processor determines that at least one of the paired mobile devices is lost.

20 Claims, 7 Drawing Sheets

(56) References Cited

OTHER PUBLICATIONS

Hu, "Using a Personalized Machine Learning Approach to Detect Stolen Phones", A thesis submitted to the Graduate School of Florida Institute of Technology, Dec. 2015, 45 pages, Melbourne, FL.

Feuz, et al., "Detection of lost status of mobile devices", Technical Disclosure Commons, Nov. 22, 2017, Defensive Publications Series.

* cited by examiner

LOST DETECTION FOR PAIRED MOBILE DEVICES

BACKGROUND

The present invention relates to mobile devices, and more specifically, to lost detection for paired mobile devices.

With rapid development and usage of various mobile devices, more and more devices are paired for users' convenience such as a cell phone and a smart ring, or a cell phone and a pair of Bluetooth wireless earphones. The pairing among mobile devices could be implemented through Bluetooth connection or any other types of wire or wireless connections. Since the size of mobile devices is becoming smaller and smaller, they are more easily lost. Therefore, it is becoming difficult to find lost or stolen devices because the user may not even know where the mobile devices are left or where they are stolen.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to one embodiment of the present invention, there is provided a computer-implemented method. According to the method, a processor receives behavior data of paired mobile devices from one or more sensors of the paired mobile devices, wherein the behavior data comprises one or more parameters that reflect current status of the paired mobile devices. The processor compares the received behavior data with human behavior data model. In response to the received behavior data being not matched with the human behavior data model, the processor determines that at least one of the paired mobile devices is lost.

According to another embodiment of the present invention, there is provided a computer system, the computer system comprises a processor and a computer-readable memory coupled to the processor. The memory comprises instructions that when executed by the processor perform a method. According to the method, a processor receives behavior data of paired mobile devices from one or more sensors of the paired mobile devices, wherein the behavior data comprising one or more parameters that reflect current status of the paired mobile devices. The processor compares the received behavior data with human behavior data model. In response to the received behavior data being not matched with the human behavior data model, the processor determines that at least one of the paired mobile devices is lost.

According to another embodiment of the present invention, there is provided a computer program product. The computer program product comprises a computer readable storage medium having program instructions embodied therewith, the program instructions executable by a processor to cause the processor to perform a method. According to the method, a processor receives behavior data of paired mobile devices from one or more sensors of the paired mobile devices, wherein the behavior data comprising one or more parameters that reflect current status of the paired mobile devices. The processor compares the received behavior data with human behavior data model. In response to the received behavior data being not matched with the human behavior data model, the processor determines that at least one of the paired mobile devices is lost.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
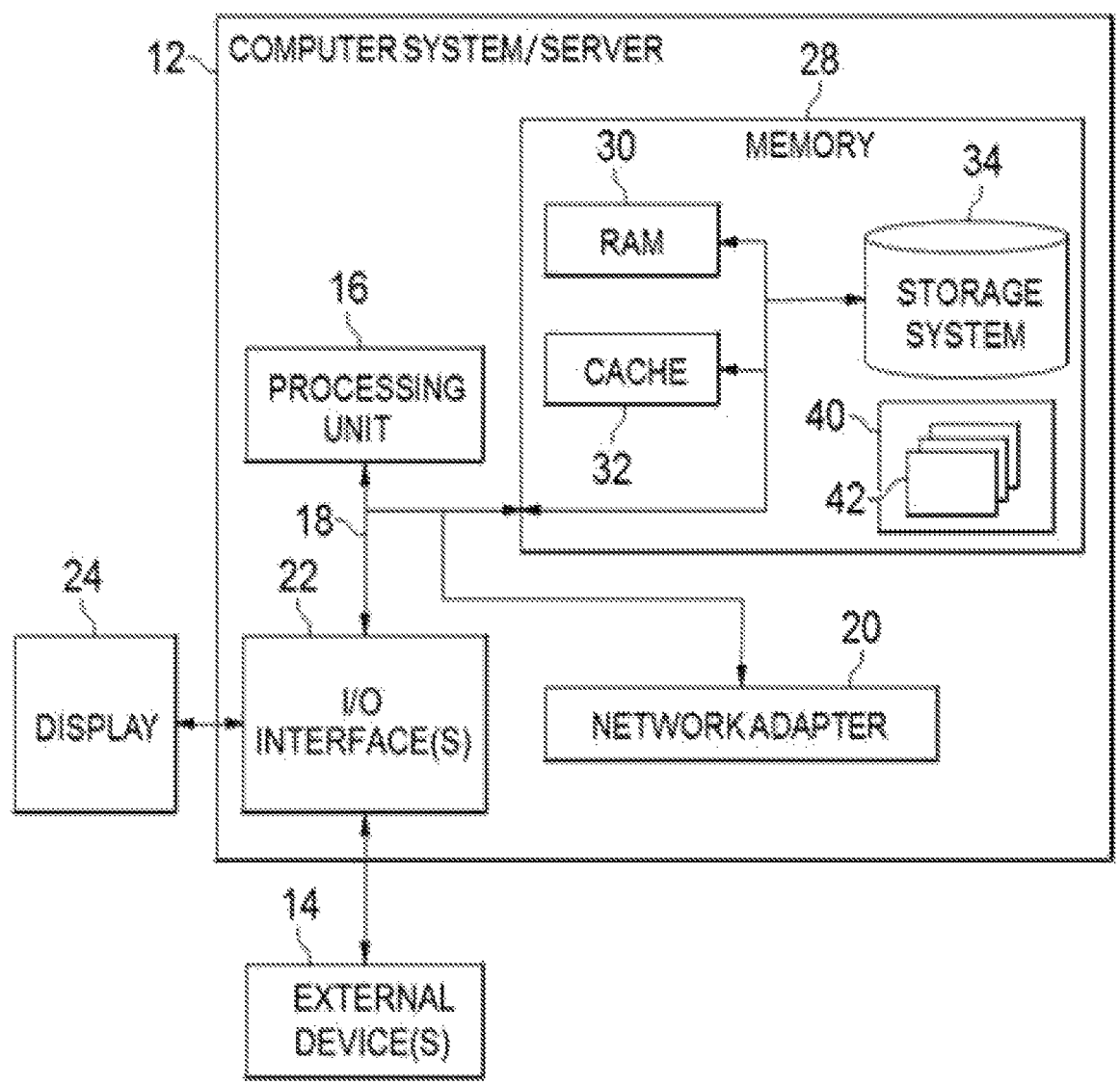
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
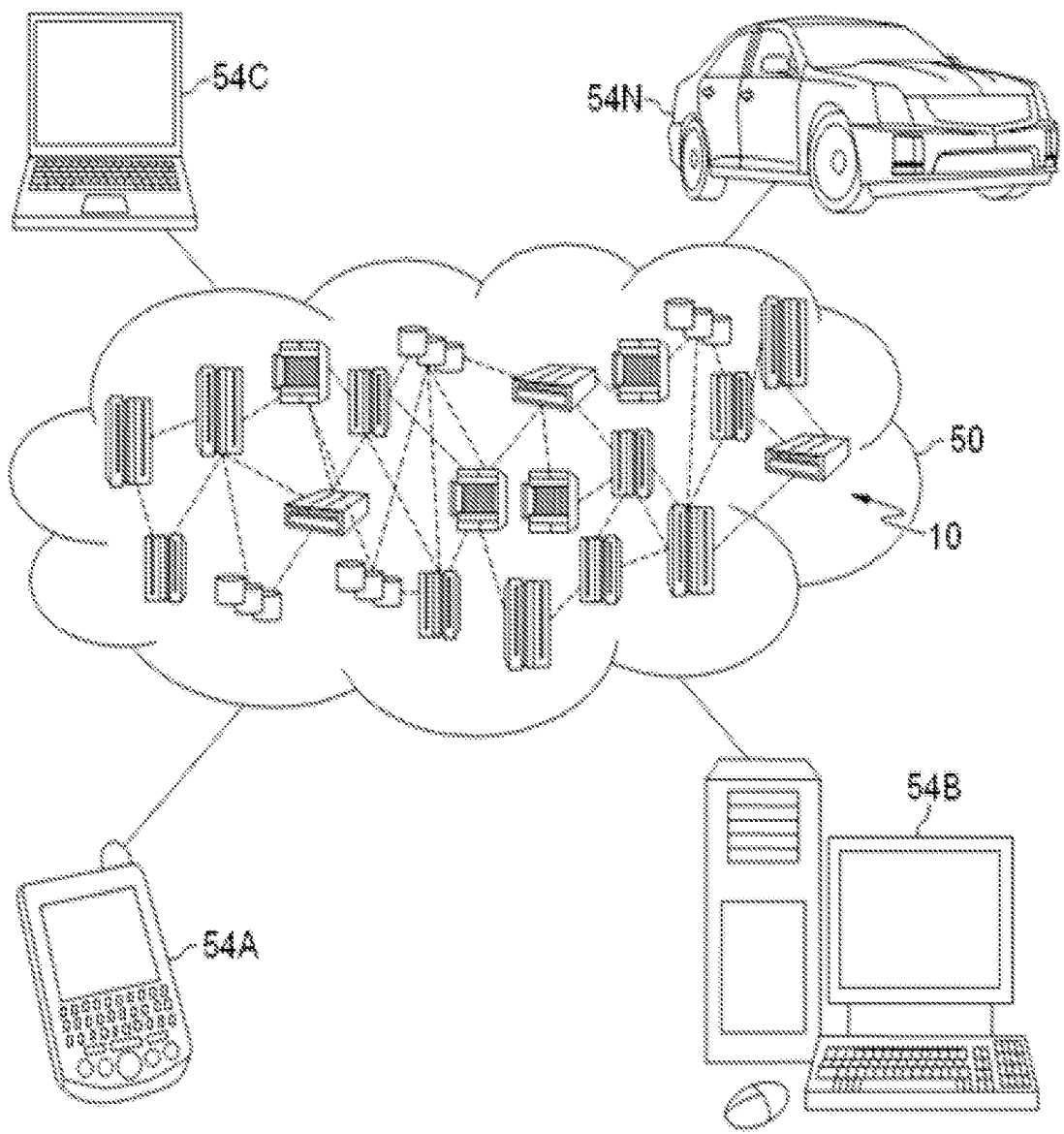
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
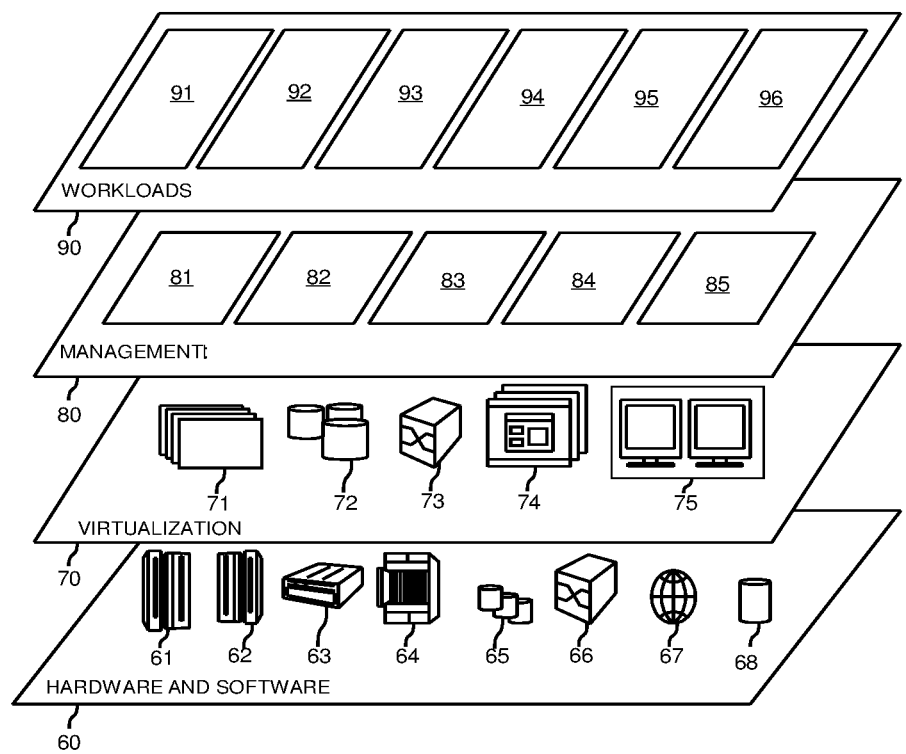
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and lost detection for paired mobile devices processing 96.

It should be noted that the processing of lost detection for paired mobile devices according to embodiments of this disclosure could be implemented by computer system/server 12 as described in FIG. 1. In other embodiments, the processing of lost detection for paired mobile devices may be achieved in block 96 of workloads layer 90 as described in FIG. 3.

It is noted that, in addition to the cloud system described above, embodiments of the present disclosure can be implemented in any computer and network systems. Also the present disclosure is not limited to the computer system described above, for example, with reference to FIG. 1.

Some solutions for lost detection for paired mobile devices have been disclosed for this purpose using embedded sensors in the mobile devices. For example, G-sensor to measure linear acceleration or a gyroscope has been used in a single device to detect whether the single device is lost. This solution is effective with a single device but is limited to working when the motion status of that single device is changed. As for paired devices, monitoring Bluetooth connectivity is limited to between only two devices because a Bluetooth device can only connect to one other device at a time. Therefore, if there are multiple devices to be monitored against loss, another solution is needed. Additionally, because the distances between Bluetooth devices may be measured in meters, there may be a time delay (latency) in communicating during connecting the devices, and also between recognizing the loss of the connection. Additionally, the existing solutions may rely on only a single metric. However, human behavior is more complicated than a single metric can indicate. For example, relying on a G-sensor or gyroscope limits lost detection to only when the state of motion of the device is changed. For example, the change in state of motion may require the addition of time of day to determine whether, according to the user's personal behavior, the motion is within a normal range.

Embodiments of the present invention include a lost detection method for multiple mobile devices. The embedded sensors in the devices, such as G-sensors and gyroscopes, are utilized, along with an insight into human behavior. The G-sensor and gyroscope data are collected and uploaded onto a backend server. The backend server processes the data and extracts features that are related to the paired devices. Decisions are made on whether the device is Safe or not using a common human behavior model and a personal human behavior model which is learned from the features of the paired devices and the user's personal behavior.

By comparing the real-time motion features of paired devices with an insight into common human behavior, the lost determination function may be timely and accurate. More than two devices can be paired and monitored. In the case of complicated motions, such as those detected by a sports watch while the user is playing a sport, the owner's behavior in the form of features between two devices can be learned to increase accuracy of lost detection.

Embodiments of the present invention are described with reference to FIG. 4, which depicts a simplified infrastructure of lost detection for paired mobile devices.

Two types of human behavior are leveraged to make decision about lost detection. Common Human Behavior (CHB), is the human behavior that is common among different individual and can be gained from daily observation. Personal Human Behavior (PHB), is the specific human behavior of the device owner. Since it is specific to device owner, it is learned from experience. Embodiments of the present invention leverage these two types of human behavior. The Common Human Behavior is extracted to make an instant decision. This model covers most use scenarios in daily life. It also reduces the complexity of learning the Personal Human Behavior model. Priority is given to the decision made from Common Human Behavior, once a decision is made from this model, the work flow is done.

Figure 4:
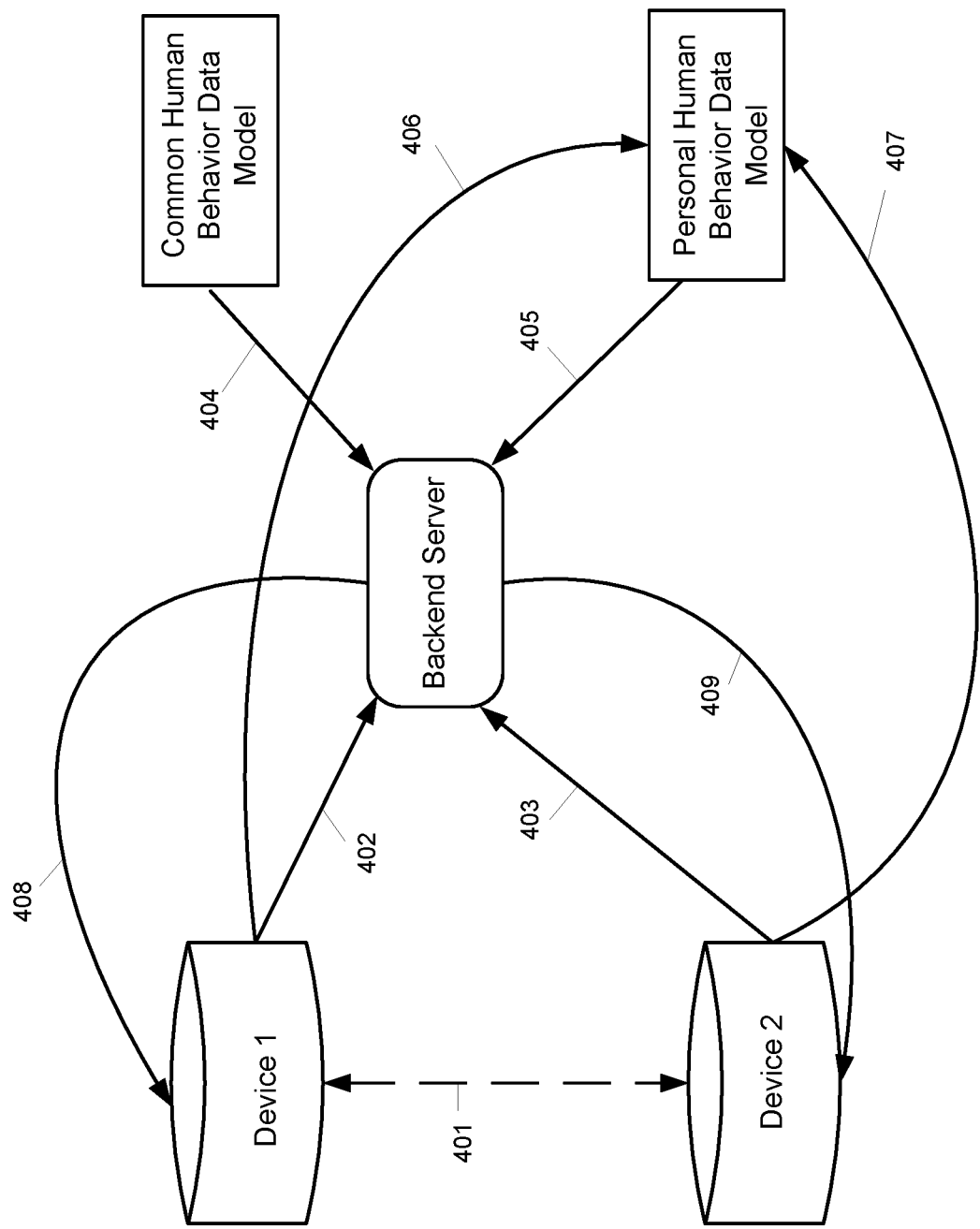
FIG. 4 depicts a simplified infrastructure of lost detection for paired mobile devices according to an embodiment of the present invention.

As shown in FIG. 4, Device 1 and Device 2 are two paired mobile devices. Dotted line 401 shows that they are paired through Bluetooth, WIFI, or any other type of connection method. Paired devices in the present invention could be any number of paired devices, and are not limited to two devices that are paired together. Backend server receives behavior data from Device 1 (line 402) and Device 2 (line 403) respectively. The behavior data is generated during the usage of Device 1 and Device 2 by the device user, including but not limited to, for example the status of Device 1 and Device 2, the current time of usage, the moving speed and moving direction of Device 1 and Device 2 and so on.

The received behavior data is compared with pre-existing human behavior data models including common human behavior data model (CHB) and personal human behavior data model (PHB). In this context, CHB represents human behavior that is common among different individuals in using the paired devices. CHB can generally include responses of individuals to internal and external stimuli. This may include an array of physical actions and observable emotions. PHB represents human behavior that is specific to the user when using the paired devices. CHB and PHB are input to the backend server in line 404 and line 405 respectively. PHB, which is specific to the user of the paired devices, is learned through machine learning algorithms from daily operation of the user, as shown by line 406 and 407. If the comparison result is that the received behavior data is matched with the CHB and/or PHB, then it is determined that no device of the paired devices is lost. If the comparison result is that the received behavior data is not matched with the CHB and/or PHB, then it is determined that at least one of the paired devices is lost and thus the backend server will send an alert to Device 1 and/or Device 2 (as shown by line 408 and 409 respectively). By using a combination of CHB, which represents general customs of human behavior, and PHB, which represents specific customs of the user in using certain paired devices, the accuracy and efficiency of determining lost paired mobile devices is improved.

Figure 5:
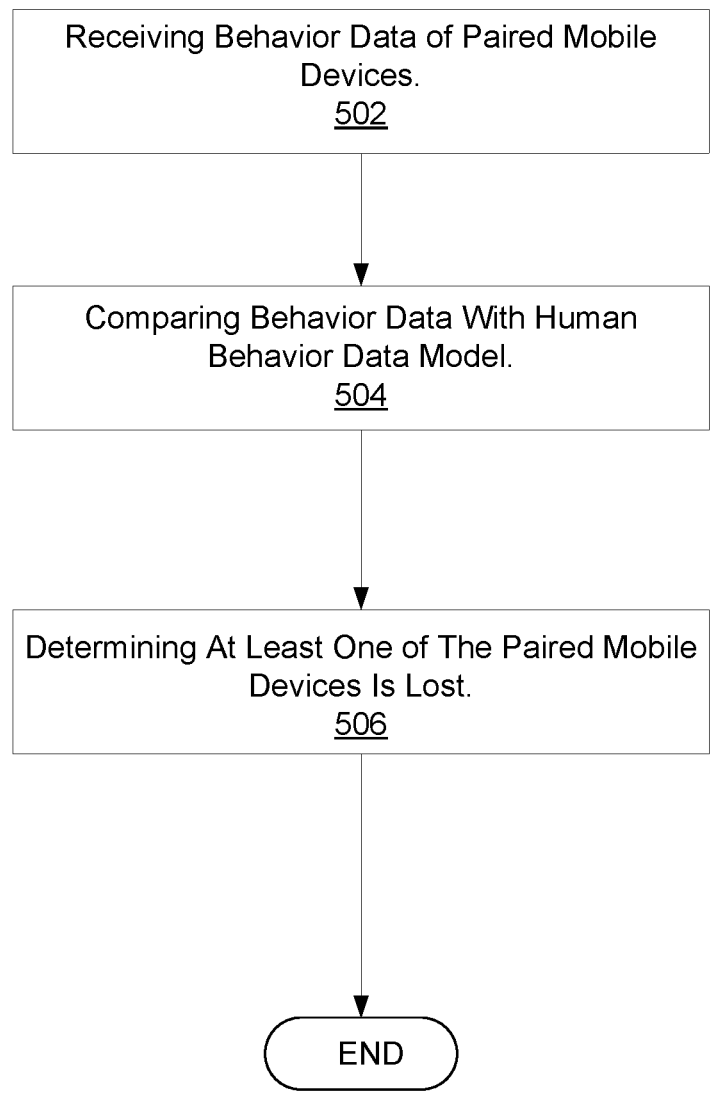
FIG. 5 is a flow chart of a method of lost detection for paired mobile devices according to an embodiment of the present invention.

FIG. 5 is a flow chart of a method of lost detection for paired mobile devices according to an embodiment of the present invention.

The value of the G-sensor can be complicated. For example, there may be a high level of background motion if the user is standing on a bus. However, measurements such as peak value, interval or frequency of the background motion are different from those introduced by human behavior. Thus, the background motion can be filtered by these features accordingly.

A mobile device is considered to be under a certain status only within a specific sampling monitoring time slot, such as 5 seconds. Three types of motion features can be extracted. A static feature is recognized with the user is at a standstill, whether on the ground or in a vehicle. Regular motion has some specific frequency and peak value, for example, when the user is walking. Irregular motion has no fixed pattern, for example, when the user is playing sports or doing something with hands when wearing smart ring. A particular type of motion may not be consistent during the monitoring time slot, but indicates the overall status. For example, if the user is doing something with hands when walking, the motion feature of the smart ring is in fact something like "Regular+Irregular". But if the Regular pattern takes up a larger portion within the time slot, the final result of the feature is considered as Regular.

As shown in the FIG. 5, the method 500 starts at step 502. At step 502, the backend server receives behavior data of paired mobile devices from one or more sensors of the paired mobile devices. According to an embodiment of the present invention, the received behavior data comprises one or more parameters that reflect current status of the paired mobile devices.

There could be various kinds of paired mobile devices, such as a cell phone paired with a smart device (e.g., a bracelet, watch), or a cell phone paired with a Bluetooth device. It is not necessary that the paired devices be connected through Bluetooth, WIFI or any other particular connection protocol. In the context of embodiments of the present invention, "paired devices" are those that the user appoints designates as "paired," but the paired devices do not communicate with each other directly. According to an embodiment of the present invention, paired devices could comprise two, three, four or even more devices as long as they are designated as paired devices.

In step 502, the behavior data is measured or collected by the paired devices through their sensors. Depending on what parameters the human behavior data model contains, the behavior data with the same parameters will be received for further comparison. According to an embodiment of the present invention, sensors in paired devices may collect relevant behavior data, such as moving speed or moving direction, in accordance with configurable time intervals, such as every 10 seconds, or every minute. The sensors may then send the collected behavior data to the backend server according to the same or a different configurable time interval.

In step 504, the backend server compares the received behavior data with human behavior data model. According to an embodiment of the present invention, the human behavior data model contains information regarding the expected parameters of paired devices, based on history experience. The human behavior data model is stored in the backend server beforehand for comparison with received behavior data. For example, a human behavior data model for phone—smart ring paired devices could record that if the phone is moving in one direction, the smart ring should also be moving in the same direction (or a similar direction with the gap less than pre-determined configurable threshold.

In step 506, in response to the received behavior data being not matched with the human behavior data model, the backend server could determine that at least one of the paired mobile devices is lost. For example, if the received behavior data (step 504) is that the smart ring is moving north while the smart phone is moving east, then the backend server may determine that either the ring or the phone is lost because the received behavior data is not matched with the human behavior data model.

It should be noted that the backend server is an example embodiment. In additional embodiments, the method could be implemented using more than one separate server.

It can be seen from the above description on FIG. 5 that human behavior data model is used to compare with the received behavior data to determine whether any of paired devices is lost. Human behavior data model reflects characteristics of the relationship between paired devices. Therefore, it can be used to determine whether any of the paired devices is lost.

Figure 6:
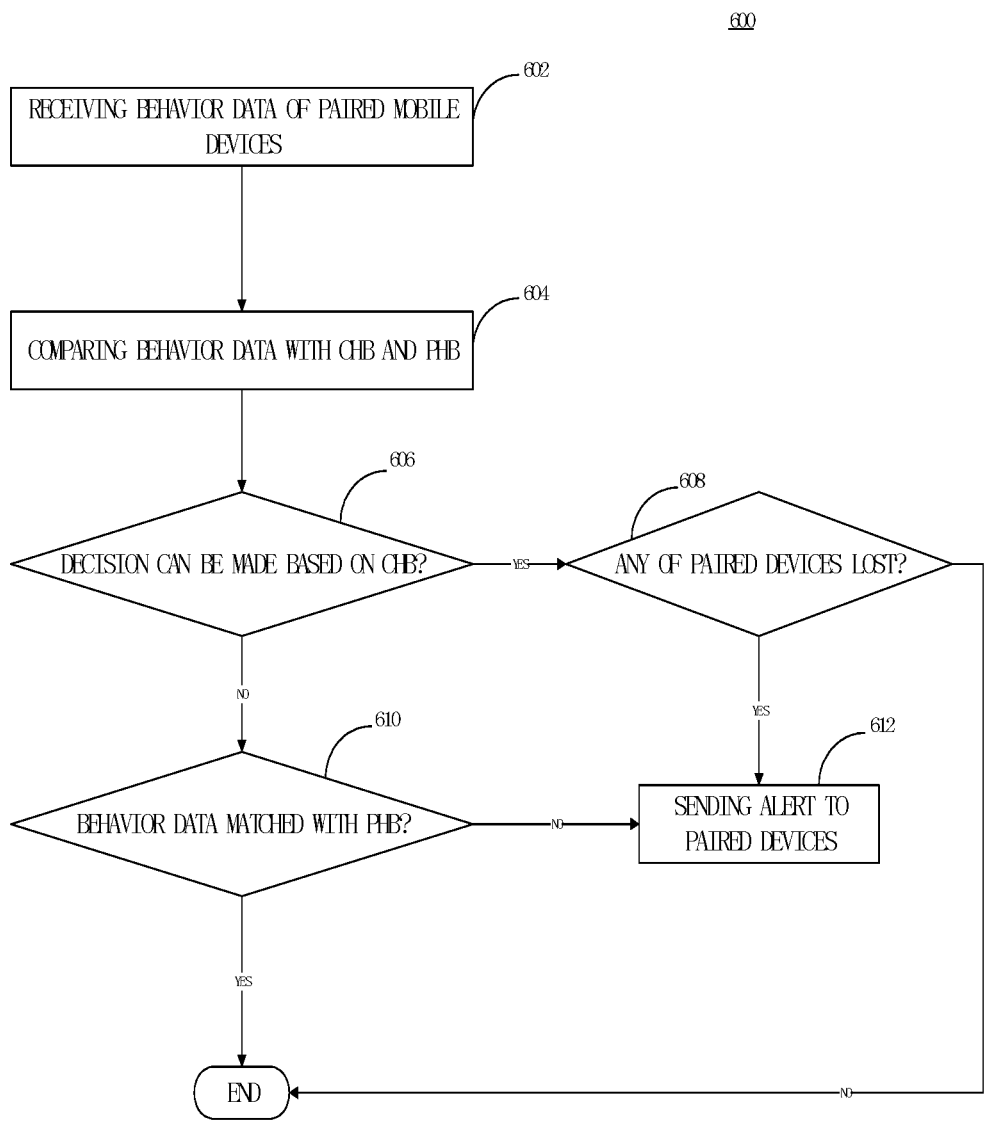
FIG. 6 is a flow chart of a method of lost detection for paired mobile devices according to a further embodiment of the present invention.

FIG. 6 is a flow chart of a method of lost detection for paired mobile devices according to a further embodiment of the present invention. Method 600 in FIG. 6 starts at step 602, which corresponds to the step 502, described above with reference to FIG. 5.

According to an embodiment of the present invention, the human behavior data model comprises at least one of common human behavior data model (CHB) and personal human behavior data model (PHB). CHB represents human behavior that is common among different individuals. According to an embodiment of the present invention, CHB is set up based on history experience and stored in the backend server, without being dynamically adjusted during the usage of certain paired devices by the user. Following Table 1 is an example of CHB for paired devices—a smart phone and a smart ring.

TABLE 1

| Smart Ring | Smart Phone | | |
|---|---|---|---|
| | Static | Regular | Irregular |
| Static | Safe | Unsafe | Unsafe |
| Regular | Unsafe | Depends on Frequency and Gyra included angle | Unsafe |
| Irregular | Forward to PHB model | Forward to PHB model | Forward to PHB model |

In Table 1, different moving status of smart phone and smart ring are provided. For example, if the smart phone's status is static, and the smart ring's status is also static, then CHB could determine it as Safe, which means no device of the paired devices is lost. For another example, if smart phone's status is Regular (regular movement with certain frequency and speed), and the smart ring's status is static, then CHB could determine it as Unsafe, which means either the smart ring or the smart phone is lost. The reason is that according to common human behavior data model, it is not likely that the smart phone is moving regularly while its paired smart ring is kept static. For a further example, when the smart phone's status is Static while the smart ring's status is Irregular, it cannot be determined whether any device is lost solely based on the CHB because we need further detail human behavior information to make a solid determination. For example, sometimes the user may put his/her smart phone aside while wearing the smart ring and may be walking around not far away from the smart phone. In such situation, the received behavior data will be further forwarded to PHB model.

It can be seen from the above that the CHB is basic information based on history experience about how people would normally use the paired devices. For different paired devices, there could be different CHB. For example, Table 1 is a sample CHB for smart phone—smart ring devices, and another CHB could be generated for smart phone—Bluetooth earphone devices.

In step 604, the received behavior data of paired devices is compared with CHB and PHB. In step 606, it is determined whether a decision regarding whether at least one of the paired mobile devices is lost can be made solely based on CHB. If it can be, then the method 600 moves to step 608 to determine if any of the paired devices is lost. For example, in Table 1, if the phone's status is Static and ring's status is also Static, then a decision can be made solely based on the CHB that both of the paired devices are Safe. If the phone's status is Static while the ring's status is Regular, then a decision can also be made solely based on the CHB that it is Unsafe—some of the paired devices could be lost.

In step 608, if the answer is Yes, then in step 612, the backend server sends out an alert to paired devices that some of the paired devices might be lost. According to an embodiment of the present invention, the alert could be an automatic phone call to the phone, and a shake on the ring. Any type of alert could be used by persons skilled in the art. In step 608, if the answer is No, then that means all the paired devices are Safe, so the method 600 comes to an end.

Returning now to step 606, if the answer is No, a decision cannot be made solely based on CHB, and the method 600 moves to step 610. For example, in Table 1 above, if the phone's status is Irregular and the ring's status is also Irregular, then CHB is not enough to make a solid decision. So, the received behavior data needs to be further compared with personal human behavior data model (PHB) to determine whether any of the paired devices is lost. In step 610, the received behavior data is compared with PHB.

According to an embodiment of the present invention, PHB represents human behavior that is specific to the user of the paired devices. Although there is common people's normal usage characteristics in using the paired devices (CHB), different people may have different hobbies and styles in using mobile devices. For example, a user may prefer exercising at night. So, for these people, if the smart phone's status at night is Regular moving, then it is normal. But some users may never exercise at night. So, for these people, if the smart phone's status at night someday is Regular moving, then it could be Unsafe. Since PHB is specific to the user of the paired devices, PHB is learned from daily usage customs of the user. PHB may also be dynamically adjusted, improved, or modified everyday together with the usage of the paired devices. According to an embodiment of the present invention, PHB contains at least one of the following parameters, as read by the sensors on the paired devices: time, difference between G-sensor values, angle of gyroscope, normal to abnormal ratio, direction of accelerated speed, direction of angular speed and background noise.

Figure 7:
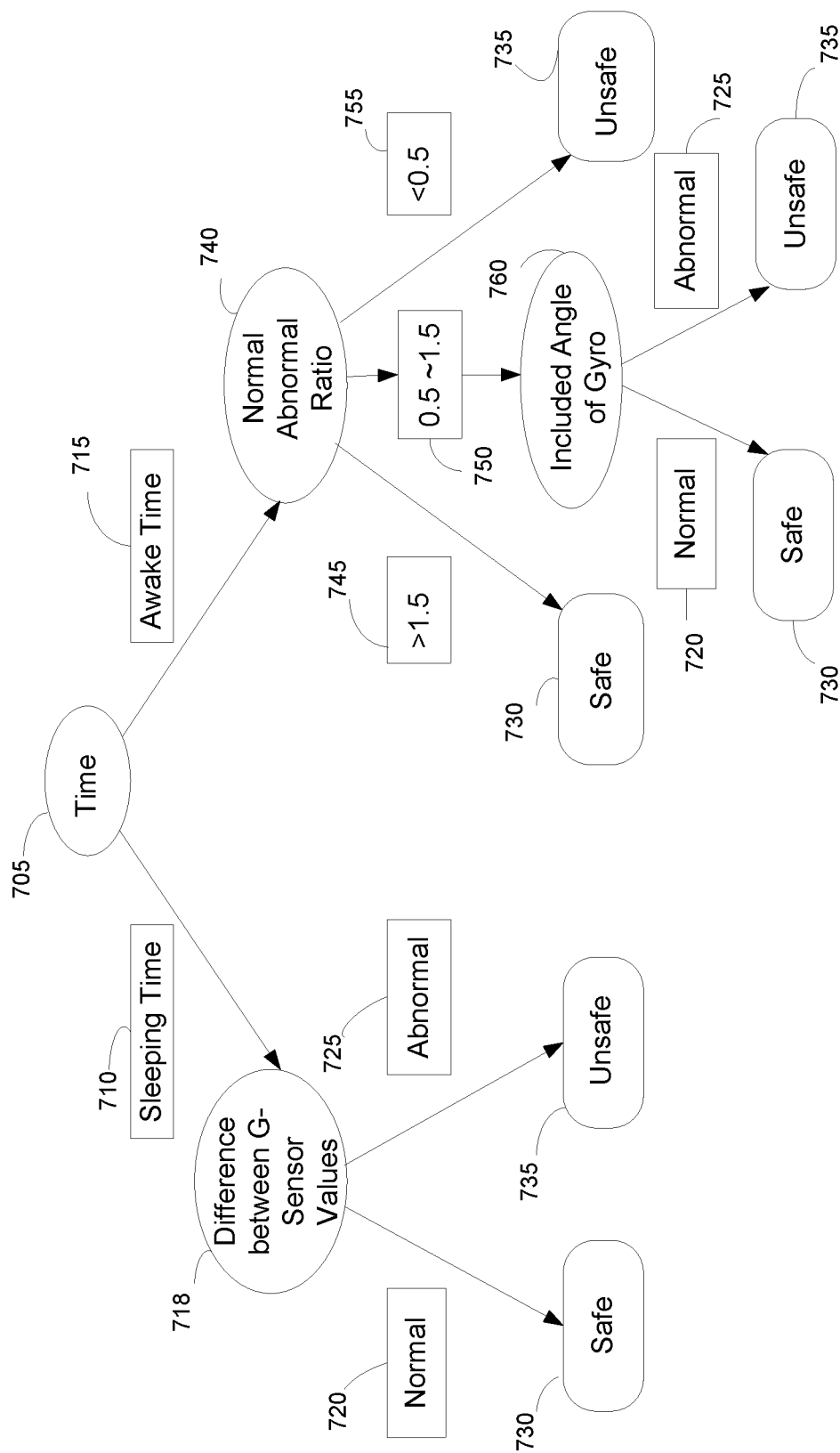
FIG. 7 shows an example of a decision tree under personal human behavior data model according to an embodiment of the present invention.

The parameter of time (705 of FIG. 7) is included in capturing the personal human behavior, since people typically have different schedules and activities depending on the time of day. For example, for some people sleeping time may be from 11 PM to 7 AM, while for other people, sleeping time may be from 7 AM to 4 PM. In FIG. 7, sleeping time is indicated by 710. The remaining time is assumed to be awake time 715.

The parameter of difference between G-sensor values (718 of FIG. 7) may be monitored in sampling time points. These may be defined as a configurable number of samples taken during a configurable monitoring time slot. These samples represent the received behavior data for the difference between G-sensor values. For example, within each defined monitoring time slot there may be 10 configured sampling time points. At each sampling time point, the G-sensor value difference on the same dimension is compared with the historical values in the PHB. If any of the sample is abnormal (725 of FIG. 7), which is outside the ($\mu-3\sigma$, $\mu+3\sigma$) range, then it can be considered as a small possibility event. So, the value of this feature is determined as abnormal, and it may be considered Unsafe (735 of FIG. 7). Otherwise, the measurement may be considered normal (720 of FIG. 7) and Safe (730 of FIG. 7).

As for the parameter of included angle of the gyroscope (760 of FIG. 7), like the difference between G-sensor values as mentioned above, within each monitoring time slot, there may be a configurable number of sampling time points. At each sampling time point, the included angle of the gyroscope on the same dimension is compared with the historical values (PHB). If any of the sample is abnormal, which is outside the standard deviations within the population ($\mu-3\sigma$, $\mu+3\sigma$) range, then it can be considered as a small possibility event. So, the value of this feature is determined as abnormal (725 of FIG. 7).

As for the parameter of normal to abnormal ratio (740 of FIG. 7), it means the ratio of normal status to the abnormal status. For example, when the G-sensor values of both of the paired devices on a certain direction is zero, the included angle of the gyroscope (760 of FIG. 7) on the direction will be further checked. And if the difference falls into the range ($\mu-3\sigma$, $\mu+3\sigma$) (750 of FIG. 7), it is considered as a normal status (720 of FIG. 7). Otherwise, it is considered as abnormal status (725 of FIG. 7). It can be seen that the parameter of normal to abnormal ratio is a feature to provide better accuracy of the decision making.

Several typical parameters used in PHB have been described above for exemplary purposes. Persons skilled in the art should understand that different parameters may be defined as part of the PHB. Different parameters or different configurations of the normal scope can be adopted based on specific scenarios and specific paired devices.

As for PHB, based on the parameters mentioned above, a decision can be made about whether any of the paired devices is lost under some specific circumstances. Generation of PHB is a typical supervised learning problem and can be resolved by some typical supervised learning algorithms Supervised learning is the machine learning task of learning a function that maps an input to an output based on example input-output pairs. It infers a function from labeled training data consisting of a set of training examples. Since there are several existing algorithms of supervised learning, they will not be further described in detail here. Typical algorithms of supervised machine learning include, but not limited to, Support Vector Machines, Linear Regression, Logistic Regression, Naïve Bayes, Decision Tree, Neural Networks and so on. Persons skilled in the art may adopt different algorithms of supervised learning to generate PHB under the present invention.

Decision Tree will be used as an example as it is simple and easy to demonstrate the problem under the present invention. Commonly used decision tree algorithms include ID3, C4.5 and CART.

FIG. 7 shows an example of a decision tree under personal human behavior data model according to an embodiment of the present invention. As shown in FIG. 7, it is a simple decision tree learned from historical behavior of a user of the paired devices with four parameters: time 705, difference between G-sensor values 718, included angle of the gyroscope 760, normal to abnormal ratio 740 on a certain direction. Persons skilled in the art should understand that the final model in practice could be made much more complex by considering these features on different dimensions, and it is different for different users. It should also be understood that the decision tree shown in FIG. 7 is for exemplary purposes. For example, it is not necessary for the time 705 parameter to be on the top level in the decision tree. Different decision tree models can be generated for PHB based on different algorithms.

It should also be emphasized that the decision tree can also be used in generating CHB, as well as in generating PHB. A combined decision tree for both CHB and PHB can be generated by persons skilled in the art with the understanding of the idea under the present invention. Each node of the decision tree, such as time 705, and difference between G-sensor values 718, represents a parameter contained in the received behavior data and the PHB.

Returning to FIG. 6, at step 610, if the answer is No, it means a decision is made that at least one of the paired devices is lost. So, method 600 moves to step 612, in which an alert will be sent to paired devices. If the answer in step 610 is No, it means that all of the paired devices are Safe. So, the method 600 comes to an end.

It can be seen from FIG. 6 that two types of human behavior data models are used to compare with received behavior data, i.e. CHB and PHB. It can also be seen that CHB has the priority over PHB. The reason for doing this is that the CHB will be used to make instant decision because CHB is based on common people's behavior model and has less computation burden. For example, in FIG. 7, the CHB may be used to determine that the received behavior data is Safe 730 when the difference in the normal to abnormal ratio 740 exceeds a configurable threshold or deviation, here shown as 745 of FIG. 7. Otherwise, the difference in the normal to abnormal ration 740 indicates the ratio is abnormal to normal, here 755 of FIG. 7, and is Unsafe 735. CHB will cover most use scenarios in daily life. On the contrary, PHB is learned from usage customs of the user of the paired devices, and it has heavier computation burden. Giving priority to CHB can help to reduce the complexity to comparing the runtime behavior data with the PHB model. However, it should be noted that it is not necessary to differentiate a human behavior data model into CHB and PHB, or to give priority to CHB over PHB. Persons skilled in the art can still use PHB to make a decision without caring about the computation burden or combine all the features of CHB and PHB in a single decision tree to make a decision.

Now returning to step 608 in FIG. 6, it is determined whether any of paired devices is lost. It can be further determined which of the paired devices is lost.

The determination of which of the paired devices is lost is made based on behavior detection. This is because a lost device is likely to behave differently from the behavior before being lost. As an example, here "behavior" may include the following metrics: status from G-sensor; the accelerated speed value detected from G-sensor; the angular speed value detected from gyroscope. If the metrics of one of the paired devices is different from history data in the PHB corresponding to that device, then it can be determined that is the device that is lost.

According to another embodiment of the present invention, the determination of which of the paired devices is lost is made based on logic detection. If there are more than 2 devices being monitored, for example, Device 1, Device 2 and Device 3, and they are paired into the following 3 pairs: Pair 1 (Device 1 and 2); Pair 2 (Device 2 and 3) and Pair 3 (Device 1 and 3). If Device Pair 1 and Device Pair 2 both receive an alarm indicating that a device is lost within the pair, but Device Pair 3 does not receive an alarm, then Device 2 is probably the one that is lost.

Returning to step 612, it should be noted that it is not mandatory to send an alert to paired devices when determining that at least one of the paired mobile devices is lost. The alert may only be sent to the device(s) of the paired mobile devices that are not considered lost because sending alert to a lost device may alert a potential thief that he has been discovered.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor, sensor data from each device of paired mobile devices from one or more sensors of the paired mobile devices, wherein the behavior data comprises one or more configurable parameters that are defined as inputs to a personal human behavior data model, and one or more personal insights;
   comparing, by a processor, the received behavior data with a human behavior data model;
   in response to the comparing determining the status of one of the devices of the paired mobile devices is irregular, comparing the received behavior data with the personal human behavior data model;
   in response to the received behavior data being not matched with the personal human behavior data model, determining, by a processor, at least one of the paired mobile devices is lost.

2. The computer-implemented method according to claim 1, wherein the human behavior data model comprises at least one of common human behavior data model and personal human behavior data model,
   wherein the common human behavior data model representing human behavior that is common among different individuals, and the personal human behavior data model representing human behavior that is specific to the user of the paired devices.

3. The computer-implemented method according to claim 2, wherein the human behavior data model is the common human behavior data model, and the received behavior data of paired mobile devices comprises data representing at least one of the following status of the paired devices:
   static, regular movement, irregular movement.

4. The computer-implemented method according to claim 2, wherein the human behavior data model is the personal human behavior data model, and the received behavior data of paired mobile devices comprises data representing at least one of the following status of the paired devices:
   time, difference between G-sensor values, angle of gyroscope, normal to abnormal ratio, direction of accelerated speed, direction of angular speed, and background noise.

5. The computer-implemented method according to claim 2, wherein the human behavior data model comprises both of the common human behavior data model and the personal human behavior data model, and the step of determining comprises:
   determining, by a processor, whether at least one of the paired mobile devices is lost using the received behavior data and the common human behavior data model;
   in response to being unable to make a decision whether at least one of the paired mobile devices is lost using the received behavior data and the common human behavior data model, determining, by a processor, whether the received behavior data is matched with the personal human behavior data model;
   in response to the received behavior data being not matched with the personal human behavior data model, determining, by a processor, at least one of the paired mobile devices is lost.

6. The computer-implemented method according to claim 2, wherein the personal human behavior data model is represented as a decision tree learned from history data of the user of the paired mobile devices when using the paired mobile devices.

7. The computer-implemented method according to claim 1, further comprises: determining, by a processor, which device(s) among the paired mobile devices is lost; and sending, by a processor, an alarm to the device(s) among the paired mobile devices that are not lost while not sending an alarm to the devices among the paired mobile devices that are determined to be lost.

8. The computer-implemented method according to claim 1, wherein the step of determining comprises:
   using a decision tree to determine the received behavior data of paired mobile devices is matched with the human behavior data model,
   wherein each node of the decision tree representing a parameter contained in both of the received behavior data and the human behavior data model.

9. A computer system, comprising:
a processor;
a computer-readable memory coupled to the processor, the memory comprising instructions that when executed by the processor perform actions of:
receiving, by a processor, sensor data from each device of paired mobile devices from one or more sensors of the paired mobile devices, wherein the behavior data comprises one or more configurable parameters that are defined as inputs to a personal human behavior data model, and one or more personal insights;
comparing, by a processor, the received behavior data with a human behavior data model;
in response to the comparing determining the status of one of the devices of the paired mobile devices is irregular, comparing the received behavior data with the personal human behavior data model;
in response to the received behavior data being not matched with the personal human behavior data model, determining, by a processor, at least one of the paired mobile devices is lost.

10. The system of claim 9, wherein the human behavior data model comprises at least one of common human behavior data model and personal human behavior data model,
wherein the common human behavior data model representing human behavior that is common among different individuals, and the personal human behavior data model representing human behavior that is specific to the user of the paired devices.

11. The system of claim 10, wherein the human behavior data model is the common human behavior data model, and the received behavior data of paired mobile devices comprises data representing at least one of the following status of the paired devices:
static, regular movement, irregular movement.

12. The system of claim 10, wherein the human behavior data model is the personal human behavior data model, and the received behavior data of paired mobile devices comprises data representing at least one of the following status of the paired devices:
time, difference between G-sensor values, angle of gyroscope, normal to abnormal ratio, direction of accelerated speed, direction of angular speed, and background noise.

13. The system of claim 10, wherein the human behavior data model comprises both of the common human behavior data model and the personal human behavior data model, and the step of determining comprises:
determining whether at least one of the paired mobile devices is lost using the received behavior data and the common human behavior data model;
in response to being unable to make a decision whether at least one of the paired mobile devices is lost using the received behavior data and the common human behavior data model, determining whether the received behavior data is matched with the personal human behavior data model;
in response to the received behavior data being not matched with the personal human behavior data model, determining at least one of the paired mobile devices is lost.

14. The system of claim 10, wherein the personal human behavior data model is represented as a decision tree learned from history data of the user of the paired mobile devices when using the paired mobile devices.

15. The system of claim 9, the actions further comprises:
determining which device(s) among the paired mobile devices is lost; and
sending an alarm to the device(s) among the paired mobile devices that are not lost while not sending an alarm to the devices among the paired mobile devices that are determined to be lost.

16. The system of claim 9, wherein the step of determining comprises:
using a decision tree to determine the received behavior data of paired mobile devices is matched with the human behavior data model,
wherein each node of the decision tree representing a parameter contained in both of the received behavior data and the human behavior data model.

17. A non-transitory computer program product, comprising a computer readable storage medium having program instructions embodied therewith, the program instructions executable by a processor to cause the processor to:
receiving, by a processor, sensor data from each device of paired mobile devices from one or more sensors of the paired mobile devices, wherein the behavior data comprises one or more configurable parameters that are defined as inputs to a personal human behavior data model, and one or more personal insights;
comparing, by a processor, the received behavior data with a human behavior data model;
in response to the comparing determining the status of one of the devices of the paired mobile devices is irregular, comparing the received behavior data with the personal human behavior data model;
in response to the received behavior data being not matched with the personal human behavior data model, determining, by a processor, at least one of the paired mobile devices is lost.

18. The non-transitory computer program product of claim 17, wherein the human behavior data model comprises at least one of common human behavior data model and personal human behavior data model,
wherein the common human behavior data model representing human behavior that is common among different individuals, and the personal human behavior data model representing human behavior that is specific to the user of the paired devices.

19. The non-transitory computer program product of claim 18, wherein the human behavior data model is the common human behavior data model, and the received behavior data of paired mobile devices comprises data representing at least one of the following status of the paired devices:
static, regular movement, irregular movement.

20. The non-transitory computer program product of claim 18, wherein the human behavior data model is the personal human behavior data model, and the received behavior data of paired mobile devices comprises data representing at least one of the following status of the paired devices:
time, difference between G-sensor values, angle of gyroscope, normal to abnormal ratio, direction of accelerated speed, direction of angular speed, and background noise.

* * * * *